US010643660B2

(12) United States Patent
McIntosh et al.

(10) Patent No.: US 10,643,660 B2
(45) Date of Patent: *May 5, 2020

(54) VIDEO PREVIEW CREATION WITH AUDIO

(71) Applicant: ALC HOLDINGS, INC., San Francisco, CA (US)

(72) Inventors: David McIntosh, Del Mar, CA (US); Chris Pennello, Berkeley, CA (US)

(73) Assignee: ALC HOLDINGS, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/882,422

(22) Filed: Jan. 29, 2018

(65) Prior Publication Data

US 2018/0218756 A1 Aug. 2, 2018

Related U.S. Application Data

(60) Continuation of application No. 14/937,557, filed on Nov. 10, 2015, now Pat. No. 9,881,646, which is a
(Continued)

(51) Int. Cl.
| | |
|---|---|
| *H04N 5/93* | (2006.01) |
| *G11B 27/031* | (2006.01) |
| *G11B 27/34* | (2006.01) |
| *H04N 21/472* | (2011.01) |
| *H04N 21/845* | (2011.01) |

(Continued)

(52) U.S. Cl.
CPC .......... *G11B 27/031* (2013.01); *G06F 3/0484* (2013.01); *G06F 3/04842* (2013.01); *G06F 3/04855* (2013.01); *G06K 9/00751* (2013.01); *G11B 20/00007* (2013.01); *G11B 27/034* (2013.01); *G11B 27/036* (2013.01); *G11B 27/102* (2013.01); *G11B 27/105* (2013.01); *G11B 27/34* (2013.01); *H04N 5/04* (2013.01); *H04N 21/47217* (2013.01); *H04N 21/482* (2013.01); *H04N 21/8455* (2013.01); *H04N 21/8549* (2013.01)

(58) Field of Classification Search
USPC .................................................. 386/278, 248
See application file for complete search history.

(56) References Cited

U.S. PATENT DOCUMENTS

| | | |
|---|---|---|
| 5,630,105 A | 5/1997 | Itagaki et al. |
| 5,745,103 A | 4/1998 | Smith |

(Continued)

OTHER PUBLICATIONS

Corrected Notice of Allowance for U.S. Appl. No. 14/173,697 dated Nov. 8, 2016, 2 pages.

(Continued)

*Primary Examiner* — Nigar Chowdhury
(74) *Attorney, Agent, or Firm* — Kilpatrick Townsend & Stockton LLP

(57) ABSTRACT

Providing a method for creating and displaying portions of videos called video previews. The video previews may be associated with audio, such that when the video previews are activated, the audio may play with the video preview. When multiple video previews are organized to play as a playable group or composite of video previews, a corresponding composite audio file can play in response to an activation of the composite.

22 Claims, 9 Drawing Sheets

Related U.S. Application Data division of application No. 14/173,740, filed on Feb. 5, 2014, now Pat. No. 9,244,600.

(60) Provisional application No. 61/905,772, filed on Nov. 18, 2013, provisional application No. 61/847,996, filed on Jul. 18, 2013, provisional application No. 61/822,105, filed on May 10, 2013, provisional application No. 61/761,096, filed on Feb. 5, 2013.

(51) Int. Cl.

| | | |
|---|---|---|
| G11B 27/10 | (2006.01) | |
| G06F 3/0485 | (2013.01) | |
| G11B 20/00 | (2006.01) | |
| G11B 27/034 | (2006.01) | |
| G11B 27/036 | (2006.01) | |
| H04N 5/04 | (2006.01) | |
| G06F 3/0484 | (2013.01) | |
| H04N 21/482 | (2011.01) | |
| H04N 21/8549 | (2011.01) | |
| G06K 9/00 | (2006.01) | |
| G11B 27/00 | (2006.01) | |

(56) References Cited

U.S. PATENT DOCUMENTS

| | | | |
|---|---|---|---|
| 5,781,183 A | 7/1998 | Takahashi et al. | |
| 6,118,444 A * | 9/2000 | Garmon | G06F 3/0219 |
| | | | 348/722 |
| 6,204,840 B1 * | 3/2001 | Petelycky | G11B 27/034 |
| | | | 375/E7.006 |
| 6,335,985 B1 | 1/2002 | Sambonsugi et al. | |
| 6,526,577 B1 | 2/2003 | Ellis et al. | |
| 6,968,506 B2 * | 11/2005 | Yacovone | G06F 16/41 |
| | | | 715/730 |
| 7,324,119 B1 | 1/2008 | Puri et al. | |
| 7,840,661 B2 | 11/2010 | Kalaboukis et al. | |
| 7,844,352 B2 | 11/2010 | Vouzis et al. | |
| 7,844,354 B2 | 11/2010 | Keohane et al. | |
| 8,244,103 B1 | 8/2012 | Shore | |
| 8,527,646 B2 | 9/2013 | Khatib et al. | |
| 8,610,730 B1 | 12/2013 | Negulescu et al. | |
| 8,923,607 B1 | 12/2014 | Kwatra et al. | |
| 8,959,453 B1 | 2/2015 | Harnish et al. | |
| 9,024,868 B2 | 5/2015 | Oka | |
| 9,027,064 B1 | 5/2015 | Opare-Abetia et al. | |
| 9,071,867 B1 | 6/2015 | Ray et al. | |
| 9,077,956 B1 | 7/2015 | Davis et al. | |
| 9,158,440 B1 | 10/2015 | Lider et al. | |
| 9,311,824 B2 * | 4/2016 | Humphrey | G09B 15/00 |
| 9,349,413 B2 | 5/2016 | McIntosh et al. | |
| 9,378,283 B2 | 6/2016 | Batraski et al. | |
| 9,852,762 B2 | 12/2017 | McIntosh et al. | |
| 9,881,646 B2 | 1/2018 | McIntosh et al. | |
| 2001/0023200 A1 | 9/2001 | Horikawa et al. | |
| 2001/0025375 A1 | 9/2001 | Ahmad et al. | |
| 2002/0112244 A1 | 8/2002 | Liou et al. | |
| 2004/0010687 A1 | 1/2004 | Futa et al. | |
| 2004/0089141 A1 * | 5/2004 | Georges | G10H 1/0025 |
| | | | 84/609 |
| 2005/0010955 A1 | 1/2005 | Elia et al. | |
| 2005/0019015 A1 | 1/2005 | Ackley et al. | |
| 2005/0091686 A1 | 4/2005 | Sezan et al. | |
| 2005/0144016 A1 * | 6/2005 | Hewitt | G11B 27/034 |
| | | | 704/278 |
| 2005/0193341 A1 | 9/2005 | Hayward et al. | |
| 2005/0201723 A1 * | 9/2005 | Islam | G11B 27/031 |
| | | | 386/232 |
| 2005/0257152 A1 | 11/2005 | Shimizu et al. | |
| 2006/0012710 A1 * | 1/2006 | Sasaki | G11B 27/10 |
| | | | 348/515 |
| 2006/0059504 A1 | 3/2006 | Gomez et al. | |
| 2006/0077773 A1 * | 4/2006 | Seo | G11B 27/002 |
| | | | 369/30.09 |
| 2006/0077817 A1 * | 4/2006 | Seo | G11B 27/034 |
| | | | 369/47.1 |
| 2006/0187967 A1 * | 8/2006 | Fitzgerald | H04N 21/242 |
| | | | 370/503 |
| 2006/0204214 A1 * | 9/2006 | Shah | G11B 27/034 |
| | | | 386/282 |
| 2006/0272000 A1 | 11/2006 | Kwak et al. | |
| 2006/0275028 A1 | 12/2006 | Lee et al. | |
| 2007/0006262 A1 | 1/2007 | Cleron et al. | |
| 2007/0074269 A1 | 3/2007 | Hua et al. | |
| 2007/0112926 A1 * | 5/2007 | Brett | G06Q 10/109 |
| | | | 709/206 |
| 2007/0118801 A1 * | 5/2007 | Harshbarger | G11B 27/031 |
| | | | 715/730 |
| 2007/0136750 A1 | 6/2007 | Abanami et al. | |
| 2007/0245379 A1 | 10/2007 | Agnihortri | |
| 2007/0291836 A1 * | 12/2007 | Shi | H04N 21/23438 |
| | | | 375/240.01 |
| 2008/0036917 A1 | 2/2008 | Pascarella et al. | |
| 2008/0044155 A1 * | 2/2008 | Kuspa | G11B 27/034 |
| | | | 386/278 |
| 2008/0136790 A1 | 6/2008 | Hio et al. | |
| 2008/0155474 A1 | 6/2008 | Duhig et al. | |
| 2008/0178230 A1 | 7/2008 | Eyal et al. | |
| 2008/0178234 A1 | 7/2008 | Eyal et al. | |
| 2008/0204465 A1 | 8/2008 | McGowan et al. | |
| 2008/0273804 A1 | 11/2008 | Malewski et al. | |
| 2008/0301579 A1 | 12/2008 | Jonasson et al. | |
| 2009/0094159 A1 | 4/2009 | Cunningham et al. | |
| 2009/0110363 A1 | 4/2009 | Kim et al. | |
| 2009/0172197 A1 | 7/2009 | Kalaboukis | |
| 2009/0199251 A1 | 8/2009 | Badoiu et al. | |
| 2009/0241163 A1 * | 9/2009 | Seo | H04N 21/4305 |
| | | | 725/139 |
| 2009/0249421 A1 | 10/2009 | Liu et al. | |
| 2010/0023984 A1 | 1/2010 | Davi et al. | |
| 2010/0070523 A1 | 3/2010 | Delgo et al. | |
| 2010/0125875 A1 | 5/2010 | Hays et al. | |
| 2010/0183280 A1 * | 7/2010 | Beauregard | G11B 27/034 |
| | | | 386/285 |
| 2010/0186034 A1 | 7/2010 | Walker et al. | |
| 2010/0222906 A1 * | 9/2010 | Moulios | G10H 1/40 |
| | | | 700/94 |
| 2010/0232518 A1 | 9/2010 | Coleman et al. | |
| 2010/0260462 A1 | 10/2010 | Zhang et al. | |
| 2010/0260468 A1 | 10/2010 | Khatib et al. | |
| 2010/0280638 A1 * | 11/2010 | Matsuda | G06F 3/165 |
| | | | 700/94 |
| 2011/0007087 A1 | 1/2011 | Ivanich et al. | |
| 2011/0185392 A1 | 7/2011 | Walker et al. | |
| 2012/0014533 A1 | 1/2012 | Gough et al. | |
| 2012/0017150 A1 | 1/2012 | Pollack et al. | |
| 2012/0039582 A1 * | 2/2012 | Foo | H04N 5/44543 |
| | | | 386/241 |
| 2012/0079529 A1 | 3/2012 | Harris et al. | |
| 2012/0099641 A1 | 4/2012 | Bekiares et al. | |
| 2012/0120095 A1 | 5/2012 | Yoshitani et al. | |
| 2012/0141095 A1 | 6/2012 | Schwesinger et al. | |
| 2012/0173981 A1 | 7/2012 | Day et al. | |
| 2012/0201517 A1 | 8/2012 | Sakuragi et al. | |
| 2012/0278725 A1 | 11/2012 | Gordon et al. | |
| 2012/0278764 A1 | 11/2012 | Arriola et al. | |
| 2012/0290933 A1 | 11/2012 | Rajaraman et al. | |
| 2012/0314943 A1 | 12/2012 | Guerrero et al. | |
| 2012/0323897 A1 | 12/2012 | Daher et al. | |
| 2012/0328265 A1 | 12/2012 | Sakuragi et al. | |
| 2013/0007198 A1 | 1/2013 | Gupta et al. | |
| 2013/0018960 A1 | 1/2013 | Knysz et al. | |
| 2013/0024895 A1 | 1/2013 | Yong et al. | |
| 2013/0031219 A1 | 1/2013 | Liu et al. | |
| 2013/0042271 A1 | 2/2013 | Yellin et al. | |
| 2013/0047084 A1 | 2/2013 | Sanders et al. | |
| 2013/0097238 A1 | 4/2013 | Rogers et al. | |
| 2013/0097550 A1 | 4/2013 | Grossman et al. | |
| 2013/0125000 A1 | 5/2013 | Fleischhauer et al. | |
| 2013/0129317 A1 | 5/2013 | Moorer et al. | |

(56) References Cited

U.S. PATENT DOCUMENTS

| | | |
|---|---|---|
| 2013/0163963 A1 | 6/2013 | Crosland et al. |
| 2013/0174197 A1 | 7/2013 | Gunatilake et al. |
| 2013/0191776 A1 | 7/2013 | Harris et al. |
| 2013/0227062 A1* | 8/2013 | Lee .................... H04L 65/4084 709/217 |
| 2013/0317951 A1 | 11/2013 | Kuznetsov et al. |
| 2014/0079225 A1* | 3/2014 | Jarske .................... H04R 29/00 381/56 |
| 2014/0104494 A1 | 4/2014 | Begeja et al. |
| 2014/0109017 A1 | 4/2014 | Benko et al. |
| 2014/0130080 A1 | 5/2014 | Badoiu et al. |
| 2014/0143725 A1 | 5/2014 | Lee et al. |
| 2014/0169766 A1 | 6/2014 | Yu et al. |
| 2014/0219629 A1 | 8/2014 | McIntosh et al. |
| 2014/0219634 A1 | 8/2014 | McIntosh et al. |
| 2014/0219637 A1 | 8/2014 | McIntosh et al. |
| 2014/0223306 A1 | 8/2014 | McIntosh et al. |
| 2014/0223307 A1 | 8/2014 | McIntosh et al. |
| 2014/0223482 A1 | 8/2014 | McIntosh et al. |
| 2014/0325568 A1 | 10/2014 | Hoang et al. |
| 2014/0359656 A1 | 12/2014 | Banica et al. |
| 2014/0372889 A1 | 12/2014 | Anzures et al. |
| 2015/0138406 A1 | 5/2015 | Sokeila et al. |
| 2016/0064034 A1 | 3/2016 | McIntosh et al. |
| 2016/0105725 A1 | 4/2016 | Shore |
| 2016/0217826 A1 | 7/2016 | McIntosh et al. |
| 2017/0270966 A1 | 9/2017 | McIntosh et al. |
| 2018/0019002 A1 | 1/2018 | McIntosh et al. |

OTHER PUBLICATIONS

Final Office Action for U.S. Appl. No. 14/173,697 dated Feb. 25, 2016, 17 pages.
Non-Final Office Action for U.S. Appl. No. 14/173,697 dated May 28, 2015, 14 pages.
Notice of Allowance for U.S. Appl. No. 14/173,697 dated Aug. 31, 2016, 7 pages.
Non-Final Office Action for U.S. Appl. No. 14/173,715 dated Jul. 16, 2015, 18 pages.
Notice of Allowance for U.S. Appl. No. 14/173,715 dated Jan. 13, 2016, 5 pages.
Restriction Requirement for U.S. Appl. No. 14/173,732 dated Sep. 24, 2015, 7 pages.
Advisory Action for U.S. Appl. No. 14/173,732 dated Oct. 17, 2016, 4 pages.
Final Office Action for U.S. Appl. No. 14/173,732 dated Jul. 26, 2016, 15 pages.
Non-Final Office Action for U.S. Appl. No. 14/173,732 dated Dec. 17, 2015, 12 pages.
Non-Final Office Action for U.S. Appl. No. 14/173,732 dated Nov. 21, 2016, 18 pages.
Corrected Notice of Allowance for U.S. Appl. No. 14/173,740 dated Nov. 25, 2015, 2 pages.
Notice of Allowance for U.S. Appl. No. 14/173,740 dated Sep. 11, 2015, 9 pages.
Restriction Requirement for U.S. Appl. No. 14/173,740 dated Jun. 19, 2015, 8 pages.
Non-Final Office Action for U.S. Appl. No. 14/173,745 dated Feb. 11, 2016, 16 pages.
Notice of Allowance for U.S. Appl. No. 14/173,745 dated Sep. 21, 2016, 16 pages.
Final Office Action for U.S. Appl. No. 14/173,753 dated May 6, 2016, 35 pages.
Non-Final Office Action for U.S. Appl. No. 14/173,753 dated Nov. 4, 2015, 34 pages.
Non-Final Office Action for U.S. Appl. No. 14/173,753 dated Feb. 7, 2017, 37 pages.
Notice of Allowance for U.S. Appl. No. 14/173,753 dated May 16, 2017, 5 pages.
Advisory Action for U.S. Appl. No. 14/937,557 dated Aug. 9, 2017, 4 pages.
Final Office Action for U.S. Appl. No. 14/937,557 dated May 12, 2017, 13 pages.
Non-Final Office Action for U.S. Appl. No. 14/937,557 dated Sep. 23, 2016, 12 pages.
Notice of Allowance for U.S. Appl. No. 14/937,557 dated Sep. 26, 2017, 9 pages.
Non-Final Office Action for U.S. Appl. No. 15/091,358 dated Apr. 12, 2017, 21 pages.
Notice of Allowance for U.S. Appl. No. 15/091,358 dated Aug. 11, 2017, 5 pages.
Notice of Allowance dated Mar. 25, 2019 in U.S. Appl. No. 15/449,174, 22 pages.
Final Office Action for U.S. Appl. No. 15/668,465 dated Dec. 9, 2019, 36 pages.
Non-Final Office Action dated Jul. 29, 2019 in U.S. Appl. No. 15/668,465, 38 pages.

* cited by examiner

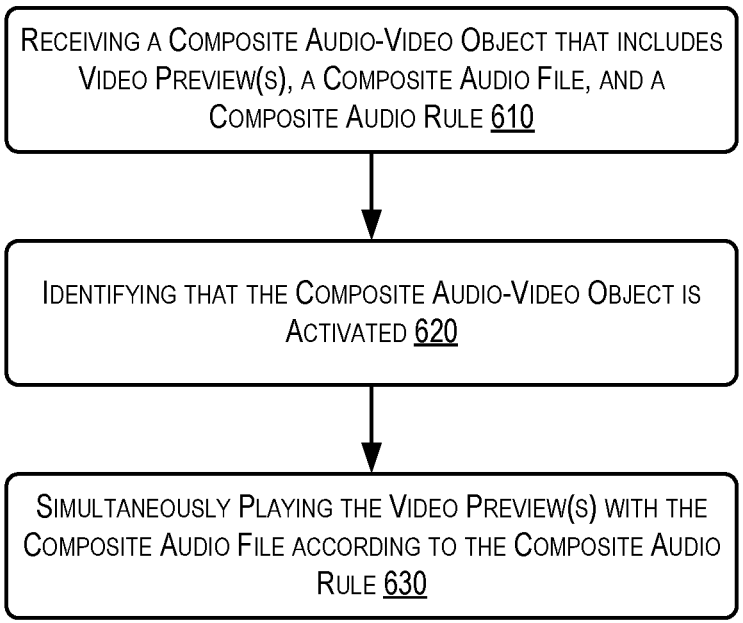

```
┌─────────────────────────────────────────────────┐
│ RECEIVING A COMPOSITE AUDIO-VIDEO OBJECT THAT   │
│ INCLUDES VIDEO PREVIEW(S), A COMPOSITE AUDIO    │
│ FILE, AND A COMPOSITE AUDIO RULE 610            │
└─────────────────────────────────────────────────┘
                        │
                        ▼
┌─────────────────────────────────────────────────┐
│ IDENTIFYING THAT THE COMPOSITE AUDIO-VIDEO      │
│ OBJECT IS ACTIVATED 620                         │
└─────────────────────────────────────────────────┘
                        │
                        ▼
┌─────────────────────────────────────────────────┐
│ SIMULTANEOUSLY PLAYING THE VIDEO PREVIEW(S)     │
│ WITH THE COMPOSITE AUDIO FILE ACCORDING TO THE  │
│ COMPOSITE AUDIO RULE 630                        │
└─────────────────────────────────────────────────┘
```

┌─────────────────────────────────────────────────┐
    │  RECEIVING AN AUDIO-VIDEO OBJECT COMPRISING A VIDEO│
    │  PREVIEW CORRESPONDING TO NON-CONSECUTIVE FRAMES OF│
    │       A FULL VIDEO AND AN AUDIO FILE 710        │
    └─────────────────────────────────────────────────┘
                             │
                             ▼
    ┌─────────────────────────────────────────────────┐
    │  RECEIVING AN ACTIVATION OF THE AUDIO-VIDEO OBJECT 720 │
    └─────────────────────────────────────────────────┘
                             │
                             ▼
    ┌─────────────────────────────────────────────────┐
    │  PLAYING THE VIDEO PREVIEW AND AUDIO FILE, THE AUDIO FILE│
    │   DOES NOT CORRESPOND WITH AUDIO OF THE NON-    │
    │            CONSECUTIVE FRAMES 730               │
    └─────────────────────────────────────────────────┘
```

FIG. 7

VIDEO PREVIEW CREATION WITH AUDIO

CROSS-REFERENCE TO RELATED APPLICATIONS

This application is a continuation of U.S. patent application Ser. No. 14/937,557, filed on Nov. 10, 2015, entitled "Video Preview Creation with Audio", which is a divisional of U.S. patent application Ser. No. 14/173,740, filed on Feb. 5, 2014, entitled "Video Preview Creation with Audio." U.S. patent application Ser. No. 14/173,740 is a non-provisional of 61/761,096, filed on Feb. 5, 2013, U.S. Patent Application No. 61/822,105, filed on May 10, 2013, U.S. Patent Application No. 61/847,996, filed on Jul. 18, 2013, and U.S. Patent Application No. 61/905,772, filed on Nov. 18, 2013, which are herein incorporated by reference in their entirety for all purposes.

This application is related to commonly owned U.S. patent application Ser. No. 14/173,697, filed on Feb. 5, 2014, entitled "Video Preview Creation with Link", U.S. patent application Ser. No. 14/173,715, filed on Feb. 5, 2014, entitled "User Interface for Video Preview Creation", U.S. patent application Ser. No. 14/173,732, filed Feb. 5, 2014, entitled "Video Preview Creation based on Environment", U.S. patent application Ser. No. 14/173,745, filed Feb. 5, 2014, entitled "Generation of Layout of Videos", U.S. patent application Ser. No. 14/173,753, filed Feb. 5, 2014, entitled "Activating a Video Based on Location in Screen", which are herein incorporated by reference in their entirety for all purposes.

BACKGROUND

Users commonly provide video content to websites (e.g., YouTube®), which can be referred to as "posting a video." The user can spend a significant amount of time to convey the message of the video before the user selects the video (e.g., by clicking the video displayed on a website). For example, the user can associate a title, a static thumbnail image, and/or a textual description with the video. Users often have a difficult time when the video originates on a different website and the user tries to upload their video to a video server. Further, the title may not be descriptive of the contents of the video, the static thumbnail image may not summarize the essence of the video, or the description of the video may be a poor signal for whether the video will be interesting to a viewer.

Video browsing is also limited. Other users (e.g., viewers) can access and view the video content via the websites. For example, the viewers can see a video's title and static thumbnail of the video before deciding whether to play the full video. However, the viewers may find it difficult to select particular videos of interest because the title may not be descriptive of the contents of the video, the static thumbnail image may not summarize the essence of the video, or the textual description with the video may be a poor signal for whether the video will be interesting to the viewer. Thus, the viewers may spend significant amounts of time searching and watching videos that are not enjoyable to the viewer.

SUMMARY

Embodiments of the present invention can create and display portions of videos as video previews. The video previews may be associated with a full video, such that the video preview is generated from a portion of the full video. In some embodiments, the video preview can be configured to play a series of images from the full video when the video preview is activated.

In some embodiments, the video preview is combined with audio, such that the audio is played according to an audio rule (e.g., the audio rule can define when to adjust the duration, pitch, volume, or fading in/out of an audio file). When multiple video previews are organized to play as a playable group or composite of video previews, a corresponding composite audio file can play in response to an activation of the composite.

Other embodiments are directed to systems and computer readable media associated with methods described herein.

A better understanding of the nature and advantages of the present invention may be gained with reference to the following detailed description and the accompanying drawings.

BRIEF DESCRIPTION OF THE DRAWINGS

FIG. 6 shows a flowchart illustrating a method of browsing video previews with audio according to an embodiment of the present invention.

FIG. 7 shows a flowchart illustrating a method of browsing video previews with audio according to an embodiment of the present invention.

DEFINITIONS

Figure 1:
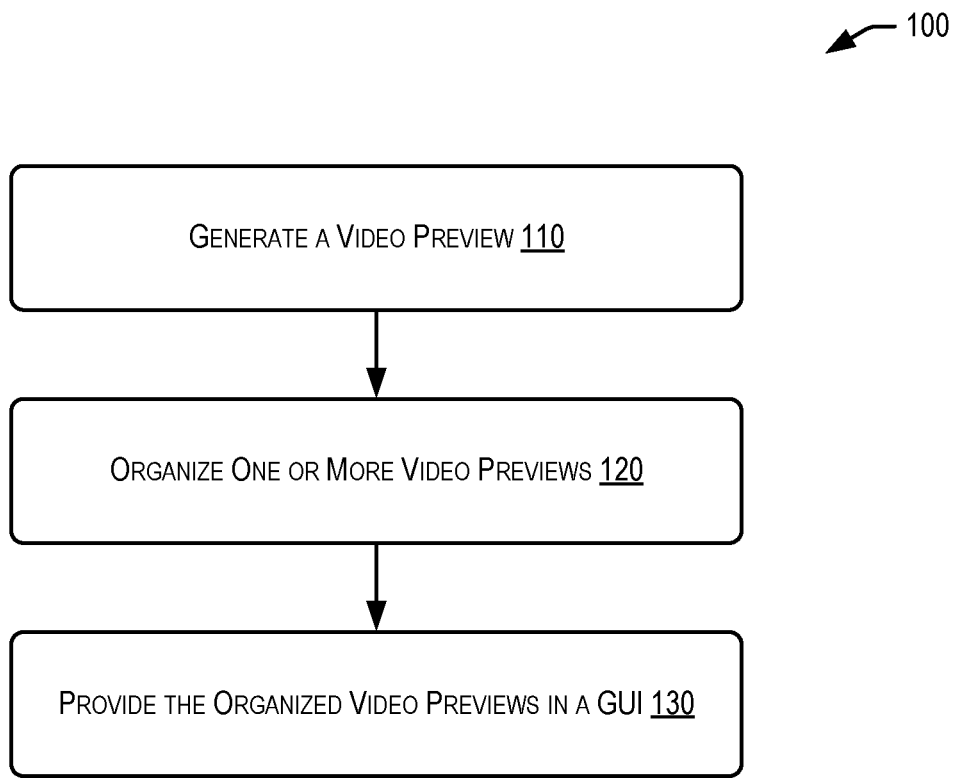
FIG. 1 shows a flowchart illustrating a method of creating a video preview, organizing the video previews, and providing a user interface that includes the video previews according to an embodiment of the present invention.

A "video preview" is a visual representation of a portion of a video (also referred to as a "full video" to contrast a "video preview" of the video). The full video may correspond to the entirety of a video file or a portion of the video file, e.g., when only a portion of the video file has been streamed to a user device. The preview is shorter than the full video, but the full video can be shorter than the complete video file. The preview can convey the essence of the full video. The video preview is shorter (e.g., fewer images, less time) than a full (e.g., more images, longer time, substantially complete) video. In various embodiments, a preview can be a continuous portion of the full video or include successive frames that are not continuous in the full video (e.g., two successive frames of the preview may actually be one or more seconds apart in the full video).

A "audio-video object" or "composite audio-video object" (used interchangeably) is an object on a GUI that is configured to play a video previews (e.g., an iframe, a frame in a current window, frame buffer object (FBO)). An audio-video object or composite audio-video object (e.g., placeholders, 2-dimensional boxes, windows, or squares) can be generated by a computing device for displaying the video preview. In some embodiments, the audio-video object or composite audio-video object will also provide filters or effects for the video preview (e.g., defined by the computing device, defined by a programming language that generates an object class).

A "composite of video previews" (also referred to simply as a "composite" or "preview composite") is an area where one or more related video preview blocks will be played. If the composite has one video preview and/or one audio file, then the composite simply corresponds to playing the preview, and the block and composite can correspond to the same area. When the composite includes multiple previews and/or multiple audio files, the composite includes multiple blocks, each playing a preview. The video previews in a composite can each link to the same full video. In one embodiment, the creator of a preview can identify the previews or audio files to include in a composite, and the composite can exist as a single display object, where the previews of the composite start playing at the time the composite is activated. The shape of a composite of video previews can be a square (2 blocks×2 blocks, N blocks×N blocks) or rectangle (1×N, 2×N, 2×2 with blocks comprising unequal sides, N×N with blocks comprising unequal sides). The composite of video previews may have a right-wise or left-wise orientation.

DETAILED DESCRIPTION

Embodiments of the present invention can enhance video viewing by providing short, playable video previews through a graphical user interface (GUI). Viewers can use the GUI of video previews to better decide whether to watch a full video, or channel of videos.

In one embodiment, the user may create a video preview that may later be accessed by a viewer. For example, the user may select the best 1-10 seconds of a video to convey the essence of the full video. The video preview can be shorter (e.g., fewer images, less time) than a full (e.g., more images, longer time, substantially complete) video. The system associated with the GUI may generate a smaller file to associate with the video portion (e.g., animated GIF, MP4, collection of frames, RIFF). The system may provide the GUI on a variety of systems. For example, the GUI can be provided via an internet browser or client applications (e.g., software configured to be executed on a device), and configured to run on a variety of devices (e.g., mobile, tablet, set-top, television).

I. Providing Video Reviews

FIG. 1 shows a flowchart illustrating a method 100 of creating a video preview, organizing the video previews, and providing a user interface that includes the video previews according to an embodiment of the present invention. The method 100 may comprise a plurality of steps for implementing an embodiment of creating a video preview with a duration of a predetermined length of time. Various computing devices may be used to perform the steps of the method, including video servers, provider servers, user devices, or third party servers.

At step 110, a video preview may be generated. Embodiments of the invention may provide a method of generating an audio-video object that includes a video preview and an audio file. The audio file may play according to an audio rule that specifies one or more criteria for how the audio file is to be played when the video preview is played in response to an audio-video object being activated. The video preview may be created to convey the essence of the full video (e.g., the user may select the best 1-10 seconds of a video, like a building imploding or a snowboarder jumping off of a cliff). When multiple video previews are organized to play as a playable group or composite of video previews, a corresponding composite audio file can play in response to an activation of the composite.

Additional means of generating video previews can be found in U.S. patent application Ser. No. 14/173,697, entitled "Video Creation with Link", U.S. patent application Ser. No. 14/173,715, entitled "User Interface for Video Preview Creation", and U.S. patent application Ser. No. 14/173,732, entitled "Video Preview Creation based on Environment", which are incorporated by reference in their entirety.

At step 120, one or more video previews may be organized into one or more channels or collections. For example, the method 100 can associate the video preview generated in step 110 (e.g., a 4-second animated GIF of a snowboarder jumping off a ledge) with a channel (e.g., a collection of videos about snowboarders). In some embodiments, the video previews may be organized in a group (e.g., a composite, a playable group, a cluster of video previews) and displayed on a network page. Additional information about the organization and layout of video previews can be found in U.S. patent application Ser. No. 14/173,745, entitled "Generation of Layout of Videos", which is incorporated by reference in its entirety.

At step 130, a GUI may be provided with the video previews. For example, the GUI may provide one or more channels (e.g., channel relating to snowboarders, channel relating to counter cultures), one or more videos within a channel (e.g., a first snowboarding video, a second snowboarding video, and a first counter culture video), or a network page displaying one or more video previews. The video previews may be shared through social networking pages, text messaging, or other means. Additional information about viewing and sharing video previews can be found in U.S. patent application Ser. No. 14/173,753, entitled "Activating a Video Based on Location in Screen", which is incorporated by reference in its entirety.

II. System for Providing Video Previews

Various systems and computing devices can be involved with various workflows used to create and play a video preview with audio.

Figure 2:
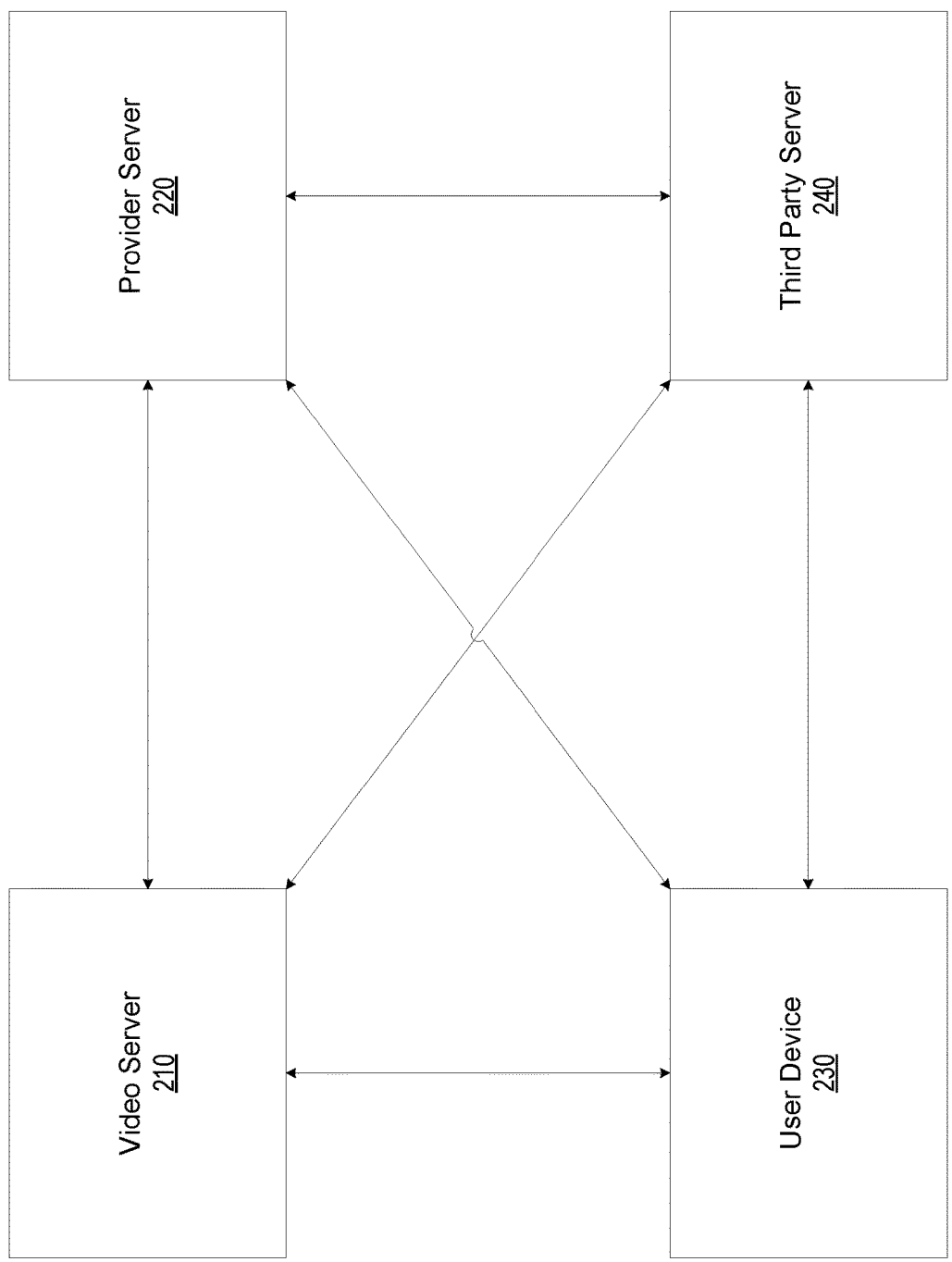
FIG. 2 shows block diagrams of various subsystems used to generate or provide a video preview.

FIG. 2 shows block diagrams of various subsystems used to generate or provide a video preview. For example, the computing devices can include a video server 210, a provider server 220, a user device 230, or a third party server 240 according to an embodiment of the present invention. In some embodiments, any or all of these servers, subsystems, or devices may be considered a computing device.

The computing devices can be implemented various ways without diverting from the essence of the invention. For example, the video server 210 can provide, transmit, and store full videos and/or video previews (e.g., Ooyala®, Brightcover®, Vimeo®, YouTube®, CNN®, NFL®, Hulu®, Vevo®). The provider server 220 can interact with the video server 210 to provide the video previews. In some embodiments, the provider server 220 can receive information to generate the video preview (e.g., a timestamp identifying a portion of a full video, a link to the full video, the full video file, a push notification including the link to the full video). The user device 230 can receive a video preview and/or full video to view, browse, or store the generated video previews. The third party server 240 can also receive a video preview and/or full video to view or browse the generated video previews. In some embodiments, the user device 230 or third party server 240 can also be used to generate the video preview or create a frame object (e.g., including an audio-video object or a composite audio-video object). Additional information about the video server 210, provider server 220, user device 230, and third party server 240 can be found in U.S. patent application Ser. No. 14/173,697, entitled "Video Preview Creation with Link" and U.S. patent application Ser. No. 14/173,715, entitled "User Interface for Video Preview Creation", which are incorporated by reference in their entirety.

In some embodiments, the video server 210, provider server 220, a user device 230, and third party server 240 can be used to generate an audio-video object. For example, the computing device (e.g., provider server 220, user device 230) may receive a video preview that comprises one or more images. The images may be associated with a video portion of the full video that corresponds to a series of images from the full video. The video can also have a video start and a video end. The computing device can also receive an audio file (that has an audio start and an audio end) and an audio rule. The audio rule can specify one or more criteria for how the audio file is to be played when the video preview is played in response to an audio-video object being activated (e.g., in response to moving to a particular location on the display). The computing device can generate an audio-video object for displaying the video preview and playing the audio file based on the audio rule.

In some embodiments, the playing of at least one of the audio start and the audio end of the audio file is not synchronized with playing the video start and the video end. The mismatched synchronization may occur for at least a portion of a duration when the video preview plays continuously one or more times.

More than one video preview may be supported as well. For example, when a second video preview is received, the computing device can correlate the second video preview with a second audio file. The second audio file can be played when the second video preview is activated. In some examples, the first and second video previews can correspond with a composite of video previews and a composite audio rule. The composite audio rule can identify when audio associated with the first video preview is muted and/or when the audio associated with the second video preview is played after the composite of video previews is activated by the computing device.

More than one audio file may be supported as well. For example, when two or more audio files correspond with two or more video previews in a composite of video previews, various methods of playing and/or muting the audio files are possible. For example, the audio files can be sequentially played, one audio file can be muted while the second audio file is played, the two audio files can be combined and played simultaneously, a separate audio file associated with the composite (e.g., a composite audio file) can play, or any other method of playing multiple audio files with multiple videos.

In some embodiments, the audio may be configured to play or stop playing (e.g., by the computing device). For example, an audio with a corresponding video preview or composite of video previews is located at the particular location on the display in the GUI. In another example, the audio may be played or stopped from playing when an activation device (e.g., finger, mouse pointer) touches or taps on a screen of the computing device. In some examples, the audio may also be configured to stop playing after a certain number of iterations.

III. Creation of a Video Preview with Audio

Embodiments can incorporate audio with video previews. For example, the computing device can create a video preview with audio by associating an audio rule with an audio file and video preview, so that the audio and video play for a viewer according to the rule. The video preview and audio file can be correlated to create an audio-visual file. The user can create the video preview with audio in a GUI.

A. Creating a Video Preview Using a Link to an Audio File

Figure 3:
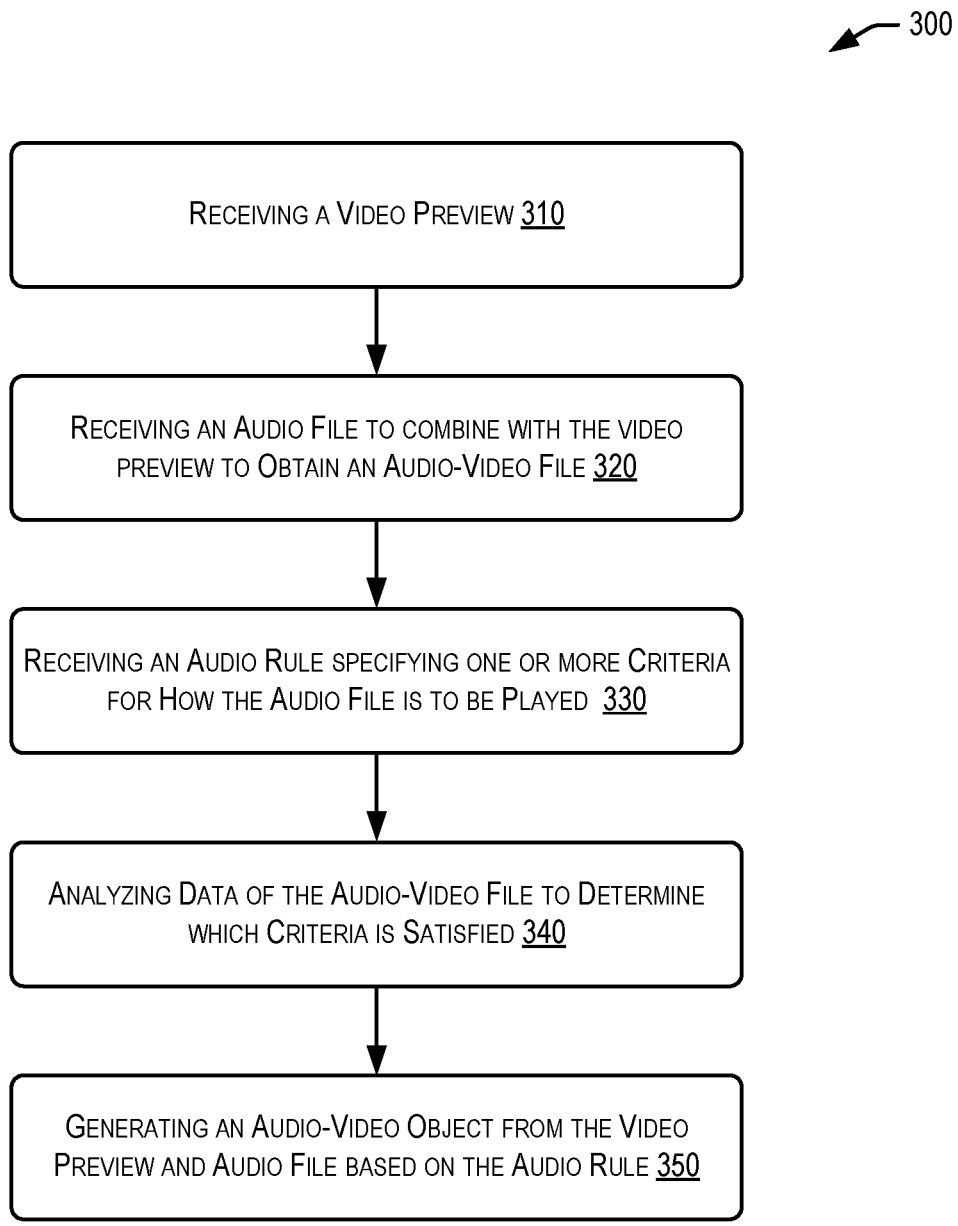
FIG. 3 shows a flowchart illustrating a method of generating a video preview with audio according to an embodiment of the present invention.

FIG. 3 shows a flowchart illustrating a method of generating a video preview with audio according to an embodiment of the present invention.

At block 310, a video preview can be received. In some examples, the video preview can have a video start and a video end (e.g., in a one-minute video, the video start is 0:00 and the video end is 1:00). The video preview can also be generated from a portion of a full video. For example, the video previews can include one or more images from a full video and/or one or more identifiers associated with content of the video previews (e.g., a video about baseball can have an identifier of "sports").

In some embodiments, the video preview is generated from a full video and then provided to a computing device. For example, the video server 210 may transmit a full video to a user device 230 through a GUI. The GUI can be configured to provide the user with the ability to indicate a video portion of a full video (e.g., a request button that allows the user device 230 to indicate a timestamp in the video preview). The user device 230 may identify a video portion of the full video by identifying a start/end time or other identification provided by the GUI. The start/end of the full video identified by a third party server 240 or user device 230 can be transmitted to the provider server 220 to generate the video preview. For example, the user device 230 may select the start time and end time of the full video provided by the video server 210 using a button on the GUI. In another example, the user device 230 may activate a button provided locally at the user device (e.g., via a software application, "app") and identify a start time and end time of the full video at the user device 230.

At block 320, an audio file can be received. The audio can have an audio start and an audio stop (e.g., in a one-minute audio, the audio start is 0:00 and the audio end is 1:00). The audio file can be combined with the video preview to obtain an audio-video file.

The audio can originate with several sources. In an embodiment, the user can select a portion of the audio from the same video, so that the audio directly corresponds with the video (e.g., using a GUI provided by the computing device to select the audio source as the received video preview). In an embodiment, the user can select a different portion of the audio of the same video. This can help avoid a garbled or unintelligible audio file if separate portions of the full video were used to create the video preview. This may also allow the user select an exemplary portion of audio that may not correspond with an exemplary portion of video so that both the audio and video can be representative of the preview.

The user may select an external source of audio to incorporate with the video preview. For example, the user can provide a file location to an audio source on a hard drive of the user device 230, external storage location (e.g., cloud storage), or URL to a storage service (e.g., SoundCloud®). The user may upload audio to the storage location and/or edit the audio file. When more than one audio file is used (e.g., two audio files), the first audio file can come from a first source or transmission (e.g., transmitted data packets) and the second audio file can come from a second source or transmission. In some examples, the multiple audio files can come from the same source or transmission.

The audio file may be stored as a single file, multiple files, or encoded with the same file as the video preview. For example, if the audio file is taken from an external source, the audio file can be a link to that external source and/or a duplicate copy of the audio file can be stored with the computing device (e.g., provider server 220). The audio file may also be stored as a track or a standalone file on a server.

At block 330, an audio rule can be received. The audio rule can specify one or more criteria for how the audio file is to be played. For example, the audio rule can specify the criteria for how the audio file is to be played when the video preview is played in response to an audio-video object being activated. In another example, the audio rule can specify when to alter the audio (e.g., fading the audio based on the movement of the audio-video object around a screen of a computing device).

For example, when the time that the audio file plays is longer than the time that the video preview plays, the user can speed up the audio file so that the audio file and video preview stop at the same time. In another example, the user may choose to repeat a portion of audio so that the audio file and video preview start and/or stop at the same time. In yet another example, the audio file ends and restarts before the video preview has completed at least once.

The audio rule can define when to repeat or stop the audio. For example, the audio file may not be the same duration as the video. The user can choose to loop the video/audio to match the other. For example, the audio file can be 60 seconds long and the video can be 10 seconds long. When looped, the same 10 second portion of video plays and repeats for a viewer six times, while a single 60 second clip of audio plays once. This may be useful when the video shows a repetitive task, like a person shoveling gravel into a wheelbarrow, where the action in the video is essentially repeated in real-life.

The audio can be altered (e.g., from its original state or from its received condition). The alterations can be saved as part of the audio rule. For example, the user may alter the speed of the audio file. For example, the user may speed up or slow down the audio file. This may help the audio file fit within a larger video preview that the user is creating.

In another example, the user may add special effects to the audio file. For example, the user can combine two sources of audio together into one audio file. The user can also associate a Doppler Shift audio effect, so that when a viewer is browsing through video previews, the pitch of the audio can change and simulate the video preview moving farther away from the viewer (e.g., the pitch is lowered to simulate the video preview moving farther away). This may also help avoid stuttering when the video preview starts or stops. In yet another example, the audio rule identifies a volume of the audio file, so that when a viewer operating the computing device moves the video preview from the right of the display to the center of the display, the pitch of the audio file is higher according to the audio rule.

In another example, the user may also include a fade in or out of the audio within a video preview. For example, the user may start with a video preview and add a segment of audio from one part of the original video, a segment of the audio from an external source, and then choose to fade the audio in and/or out between the two segments. In another example, the audio rule identifies a volume of the audio file, so that when a viewer operating the computing device moves the video preview away from a specified location of the display, the audio file fades out according to the audio rule.

At block 340, data of the audio-video file can be analyzed to determine which criteria is satisfied. For example, the audio rule may include restrictions on when audio plays with a composite of video previews where the composite of video previews includes four videos. When the analyzed video preview is a single video preview where one video preview corresponds with one audio file, the criteria may not be satisfied. In another example, the audio rule can include criteria on which audio file plays for a particular device based on an identifier. When the identifier identifies a device with a small screen, the criteria can correlate with playing only one video preview at a time and one audio file at a time.

At block 350, an audio-video object can be generated from the video preview and audio file based on the audio rule. For example, the audio file can be played according to the audio rule when the audio-video object is activated. The audio-video object can be activated in a variety of ways, including when the audio-video object is located at a particular location.

B. GUI for Adding Audio

Embodiments can provide a graphical user interface where users can specify a range in time in one or more video previews and audio files to create a video preview with audio. For example, the user may specify a 5-second portion of a demolition video that shows when the building falls to the ground and add a sound effect that corresponds to a sound of a crashing building. This 5-second portion may represent the best animated moment of the full video or the essence of the full video.

Figure 4:
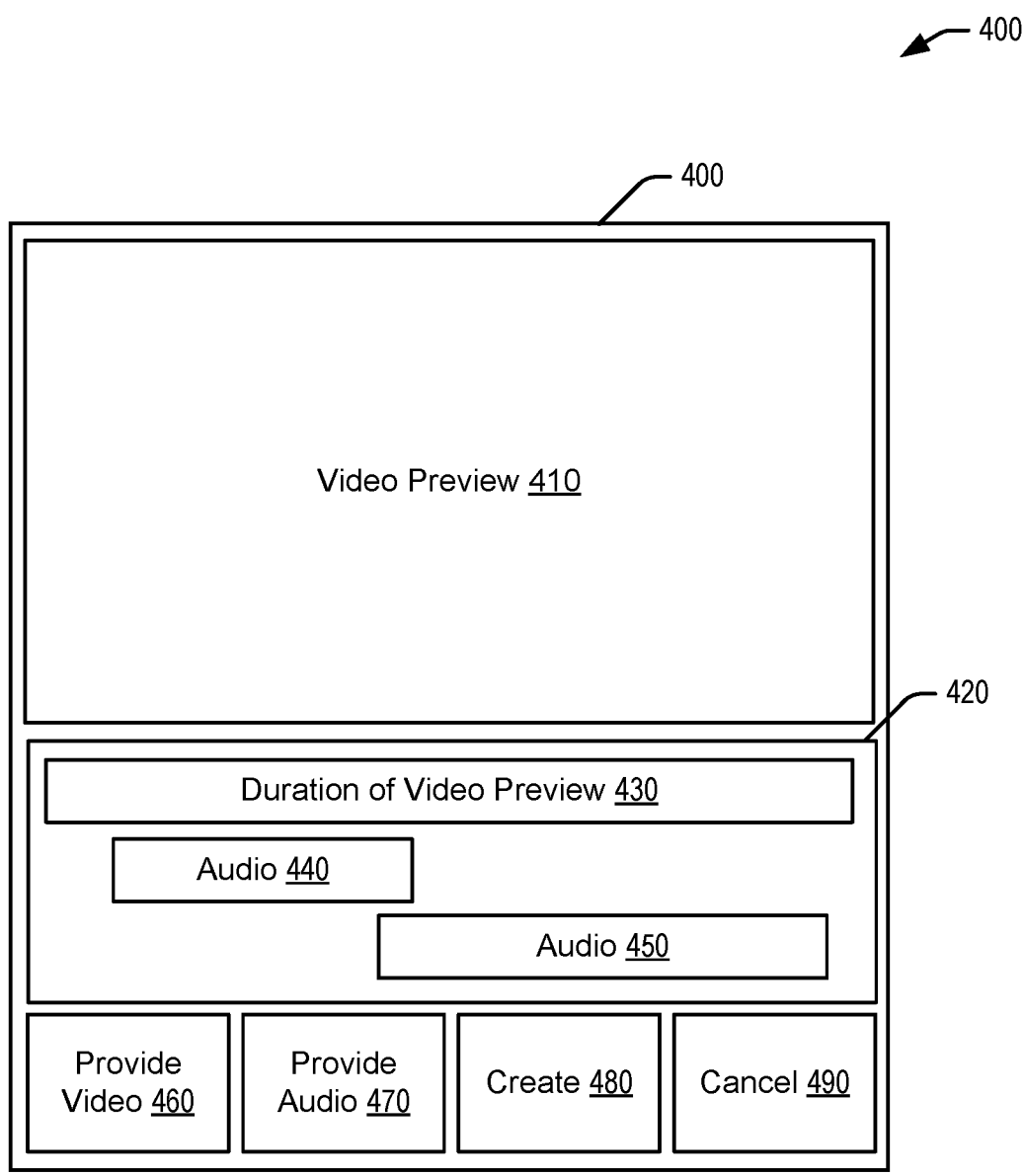
FIG. 4 shows a graphical user interface illustrating a video preview and one or more audio files according to an embodiment of the present invention.

FIG. 4 shows a graphical user interface illustrating a video preview and one or more audio files according to an embodiment of the present invention. For example, the GUI 400 can include a video preview 410, one or more depictions of the video preview and audio in an audio/video editor 420, a tool to provide a video 460, a tool to provide audio 470, a create tool 480, and a cancel tool 490. The audio/video editor 420 can include illustrations of the duration of the video preview 430, a first audio 440, and a second audio 450.

The GUI 400 can include a video preview 410. For example, the user may provide a path or link to a full video by activating (e.g., pressing, tapping) the tool to provide a video 460. The user can specify the path to the video (e.g., a source at a client computer, at an external source like a website, a provider server 220, or at a video server 210). In some examples, the user can provide a full video and the computing device (e.g., provider server 220) can create a video preview and display the video preview in the GUI 400.

The video preview may be uploaded to a computing device and identified by the GUI 400 using the tool to provide a video 460. In an embodiment, the video portion may be uploaded to the computing device directly (e.g., without a full video uploaded as well). The video portion can be combined with other previews, a group of images, or a full encoded video file (such as an MP4 file) to use to generate a video preview (e.g., to display at 410).

The user can provide video using the tool to provide a video 460 and/or provide audio using the tool to provide audio 470. For example, a user could create a 5-minute audio file while watching Netflix® or HBO GO® in his or her browser. The 5-minute file may not necessarily link to the hosted content (e.g., at the video server 210) and instead link to a location of where the newly created 5-minute file is stored (e.g., at the user device 230).

In an embodiment, the user may select multiple videos using the tool to provide a video 460 in order to incorporate into one or more video previews. For example, the user can include "snippets" or small portions of one or more full videos to generate a video preview (e.g., one video portion from one television show and one video portion from another television show, or a combination of video portions to showcase a particular actor in many roles). For example, one snippet can be taken from the video of one episode of the show and another snippet can be taken from a different episode of the show. As another example, one snippet can be taken from one show on a first channel and another snippet can be taken from a different show on the first channel.

The user may also select multiple audio files using the tool to provide audio 470 in order to incorporate into one or more audio files with the video previews. For example, the user can include "snippets" or small portions of one or more full audio files to generate an audio file (e.g., one audio portion from one television show and one audio portion from another television show, or a combination of audio portions to showcase a particular actor in many roles). For example, one snippet can be taken from the audio of one episode of the show and another snippet can be taken from a different episode of the show. As another example, one snippet can be taken from one show on a first channel and another snippet can be taken from a different show on the first channel.

The GUI 400 can also include an audio/video editor 420. The audio/video editor 420 can display a visual representation of a duration of the video preview 430, a duration of the first audio 440, and a duration of the second audio 450. The audio/video editor 420 can include this information at any time (e.g., when the video preview is received by the computing device). The audio/video editor 420 can display one or more video previews or audio files associated with one or more video previews in a temporal-based interface (e.g., the x-axis/horizontal-axis is the progression of time in which the audio plays). The user may be able to view or adjust (e.g., dragging, tapping, clicking, sliding) a visual representation of the audio in order to correlate the audio as the audio plays with the video preview (e.g., duration, pitch, volume, fading) through the use of the audio/video editor 420. In another example, the computing device can adjust the audio without instruction from the user.

Once a path or link to the video and audio have been provided, the user may use the audio/video editor 420 to select the range of image frames from the video or audio or a range of time from the video or audio to use as a video preview object. In some embodiments, the user can select a range of time (e.g., 10 seconds). In other embodiments, individual frames could be listed and a user could select a certain number of frames (e.g., 1-10) or select the individual frames (e.g., frames 0, 2, 5, 10, 15, and 20). The range can be stored as a set of images in any relevant image format (e.g., GIF, JPG). The set of images or series of notes can be placed adjacent to each other (e.g., strung together) in either the video preview or the audio file. This may create a video preview object.

Once received at the GUI (e.g., provided by a computing device, including the provider server 220 or user device 230), the user can also adjust a video start, video stop, audio start, or audio stop using one or more scroll bars provided by the audio/video editor 420. The scroll bars may be a representation of the video and audio in terms of time. For example, the length of the scroll bar can represent 4 minutes, which could be the entire length of the video.

Non-consecutive frames or images can be chosen as well. For example, a user can select several clips of an audio file that would play consecutively. In one embodiment, the audio/video editor 420 can contain a draggable "gripper" that enables the user to select a precise number of sections to use for the audio file. Multiple grippers could be added to the audio timeline and numbered. Additionally, an uploading interface could enable users to upload individual snippets of audio (e.g., crashing car, pots banging) and splice the snippets together to create an audio file with non-consecutive frames.

The user may also correlate the audio to video by specifying when the audio file should start and stop in relation to the video. For example, the user can move the visual representation of the audio start using the "gripper" to a location that lines up with the video start. In another example, the audio/video editor 420 can accept a request by the user to correlate the audio to video. In yet another example, the audio and video may be automatically correlated by being provided to the GUI, such that the GUI generates an audio-video object from any uploaded contents.

The GUI 400 may also include a create tool 480 and a cancel tool 490. For example, once the user has selected the frames or time to use for the video or audio, the user can select the create tool 480 to create a video preview, audio file, or audio-video object, or the cancel tool 490 to not create the same.

In some embodiments, the create tool 480 can be used to generate an audio rule. For example, by activating the create tool 480, the audio and/or video identified in the GUI 400, any video start/end or audio start/end, or alterations therein can be saved as the audio rule. In another example, if the audio start is not synchronized to start with the video start in the audio/video editor 420, the audio rule may also specify that the audio start is not synchronized to start with the video start.

IV. Audio Rules

Audio can play for different layouts or playable groups of video previews.

A. Default Audio Rules

A series of default audio rules can be identified or received in relation to an audio-video object. For example, all audio for video previews can be muted or silenced when browsing. When the audio-video objects are activated, the video preview can open (e.g., in a new window) and begin to play video and audio automatically.

In some examples, a background audio can play when the user is browsing through the video previews. The background audio may not be associated with any one particular video preview. In a channel setting, the background audio can correspond with the channel instead of the video previews. For example, in a channel directed to cooking shows, the background audio can be a song about baking and the audio associated with the audio-video objects can be the cooking show host explaining a portion of the recipe.

In an embodiment, a default audio portion may be selected. For example, audio associated with a top block of a 1 block×2 block composite of video previews can be playing. The viewer may be able to select another portion of the composite of video previews, e.g., the bottom block, to activate different audio.

B. Audio Rules Based on Device

In some embodiments, the audio rules can be based on a device that displays the audio-video objects (e.g., a user device 230). The computing device (e.g., provider server 220) can receive an identifier relating to a device. When the device is known to have a small screen (e.g., a small smartphone like the Apple® iPhone®), the audio rule can play a single audio file. This may assume that only one video preview can display at a time. In some embodiments, each video preview is laid out as a single playable group and the singly playable groups can be played in serial.

In another example, the identifier can identify a user device that is known to have a larger screen (e.g., a medium-sized tablet computer like the Apple® iPad®). In some embodiments, a composite audio can play. The audio rule (or composite audio rule) may not play the audio associated with the video previews in the playable group. In some embodiments, no audio may play so that the browsing can be silent. The video previews can play and audio can play when the playable group is activated (e.g., tapped or moved to a particular location).

C. Audio Rules for Composite

Figure 5:
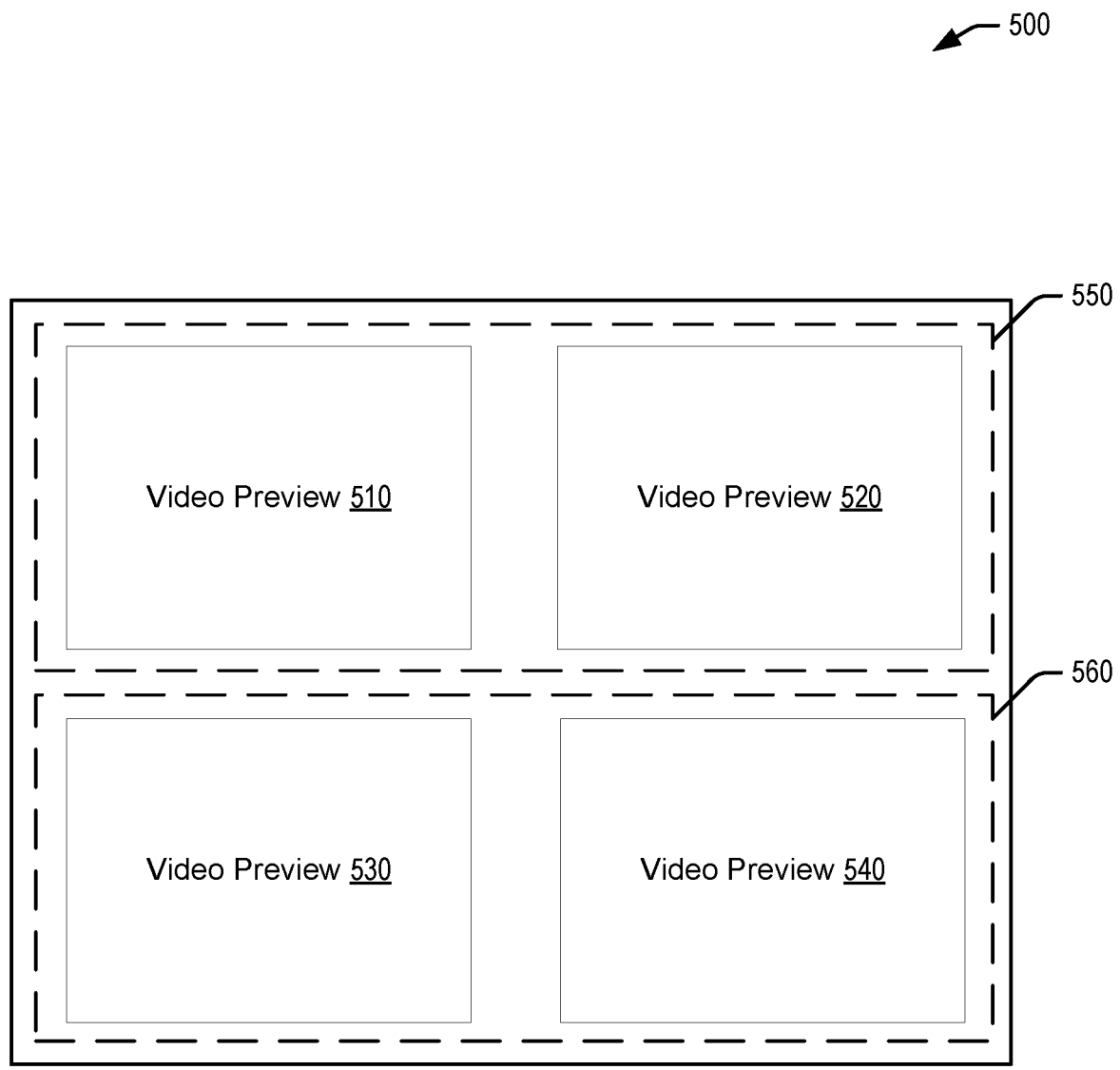
FIG. 5 shows a graphical user interface illustrating a composite of video previews according to an embodiment of the present invention.

FIG. 5 shows a graphical user interface illustrating a composite of video previews according to an embodiment of the present invention. For example, the composite of video previews 500 can include one or more video previews (e.g., 510, 520, 530, and 540). The video previews can be organized into one or more composites, including a first composite 550 containing video preview 510 and video preview 520, and a second composite containing video preview 530 and video preview 540.

Audio can play that corresponds with the composite of video previews. The audio may play while these previews are selected and/or activated, and the video associated with these groups of video previews are playing. The audio associated with other composites may be silent. When a user swipes or changes the focus, so that the other composites become activated, the system can gauge, in a Doppler Shift-like audio effect, how the audio would change if an object was moving farther away from the viewer. For example, the pitch may change to seem like the first composite 550 and second composite 560 are physically moving farther away from the viewer. The pitch may also change for the audio associated with other composites to simulate the videos physically moving closer to the viewer.

A composite audio can play when the composite arrives at a particular location. For example, when a composite is moved to a center (or upper left, right, or bottom) of the screen of a computing device (e.g., the user device 230) or GUI, the video previews and/or audio associated with the composite can play (e.g., according to the composite audio rule).

A composite audio is an entirely separate audio track. For example, the first video preview can include audio and the second video preview can include audio. The composite audio can be different audio than the audio associated with the first or second video previews. In another example, the composite audio is one of the audio files from one of the video previews. The other audio files may not be played (e.g., associating the first audio file with the composite audio file and not playing the second audio file).

A combined audio can play for the composite. For example, each video preview can be associated with audio and each of the audio tracks play at the same time (e.g., the first and second audio tracks play together). In another example, each video preview can be associated with audio and each audio track can play sequentially (e.g., the first audio track plays first, the second audio track plays second, etc.).

A composite audio is one of the audio tracks associated with the video preview, and that audio track plays for the composite of video previews. For example, the first audio file is associated with the first video preview, the second audio file is associated with the second video preview, and the composite audio file is associated with the composite of video previews (e.g., both the first and second video previews). The composite audio can play instead of the first audio or second audio.

The individual audio files associated with video previews can play sequentially. For example, three audio files associated with three video previews can be associated with each other in a composite. The first audio can play first, the second audio can play second, and third audio can play third. In some embodiments, the audio can loop. For example, the audio can play more than once. In some examples, the audio files may not need to be stored separately as a composite because the audio files may already be stored as audio files for the video previews.

V. Browsing Video Previews with Audio

Audio can correspond with video previews when a viewer is browsing through the video previews. For example, the user can select the video preview and the audio can start playing, when audio is associated with the video preview. Audio may start playing after additional actions as well (e.g., an additional click or tap on a selected video preview).

Audio may also correspond with the movement of the video preview with respect to the video preview's position in the channel or GUI. For example, as the video preview is scrolled off the screen, the pitch of the audio can change so that the video preview physically seems like it is moving farther away. This may be implemented in an embodiment that uses the Doppler Shift audio effect.

In an embodiment, the audio may fade in and out. For example, when a first video preview is selected and playing for a viewer, the audio may be playing at full volume. Once the user swipes or selects a second video preview, the audio associated with the first video preview can be lowered, the video preview can move and/or become de-selected, and the second video preview can be selected. In an embodiment, once the second video preview is selected, the audio associated with the video preview can become louder until the audio associated with this second video preview is at full volume. This can help avoid a choppy sounding audio. In other embodiments, the audio may fade in and out at different speeds. The amount of silence (e.g., lack of audio) may also be altered.

A. Browsing Composite Video Previews with Audio

FIG. 6 shows a flowchart illustrating a method of browsing video previews with audio according to an embodiment of the present invention.

At block 610, a composite audio-video object can be received. The composite audio-video object can include video preview(s) (e.g., a first video preview and second video preview), a composite audio file, and a composite audio rule. For example, the composite audio file may be associated with the composite audio-video object and the composite audio file can be played according to a composite audio rule when the composite of video previews is activated.

In some embodiments, the composite can correspond to playing multiple previews and/or multiple audio files (e.g., the composite includes multiple blocks, each playing a preview). The video previews in a composite can each link to the same full video. In one embodiment, the creator of a preview can identify the previews or audio files to include in a composite, and the composite can exist as a single display object, where the previews of the composite start playing at the time the composite is activated. The shape of a composite of video previews can be a square (2 blocks×2 blocks, N blocks×N blocks) or rectangle (1×N, 2×N, 2×2 with blocks comprising unequal sides, N×N with blocks comprising unequal sides).

The composite audio file can have an audio start and an audio stop (e.g., in a one-minute audio, the audio start is 0:00 and the audio end is 1:00). In some embodiments, the composite audio file can include one or more audio files associated with one or more video previews. In other embodiments, the composite audio file is associated with the composite as a whole. The composite audio file may be stored as a single file, multiple files, or encoded with the same file as the composite of video previews. For example, if the composite audio file is taken from an external source, the composite audio file can be a link to that external source and/or a duplicate copy of the composite audio file can be stored with the computing device (e.g., provider server 220). The composite audio file may also be stored as a track or a standalone file on a server.

In some embodiments, the composite audio-video object can be received by a computing device (e.g., user device 230) through a GUI (e.g., a network page, an application, etc.). The GUI can display the composite audio-video object on a screen of the computing device.

At block 620, the composite audio-video object can be identified as activated. For example, a computing device (e.g., user device) can identify that a composite audio-video object is located at a particular location. For example, the computing device may identify that the composite audio-video object has moved to a particular location on the display in the GUI. The computing device may identify the current location of the composite audio-video object (e.g., pixel location, relative window location) and compare the current frame location with the particular location (e.g., as defined within the GUI, defined by the video preview, or defined within the composite audio-video object using data obtained from the GUI or a server). When the composite audio-video object is placed in a particular location (e.g., the middle of a browser window, 10 pixels from the edge of the screen, in screen), the composite audio-video object can be activated.

At block 630, the video preview(s) and composite audio file can be simultaneously played according to the composite audio rule. For example, the video preview(s) and composite audio file can be played in response to the activation of the composite audio-video object. The first video preview, the second video preview, and the composite audio file may play according to the composite audio rule.

When the audio-video object is activated, the audio file may not be played for at least a portion of the duration when the video preview is played. For example, the composite audio file can play when the composite of video previews is activated, independent of activating the first video preview or the second video preview. In another example, the duration of the video preview can be two minutes. The audio-video object can be activated and the video preview can provide a series of images (e.g., that correspond with one or more portions in the full video) without audio. In some embodiments, the audio file may begin playing (e.g., after a few seconds) or may not play at all.

Playing the audio file may not be synchronized with the playing of the video preview. For example, the audio file can include an audio start and an audio end and the video preview can include a video start and a video end. The audio file may not be synchronized with the playing of the video preview for at least a portion of a duration when the video preview plays continuously one or more times. In another example, the audio file can start at 0:10 minutes of a 2-minute video preview. The audio file may end at 0:50 minutes of the video preview and start over (e.g., loop or replay), or a second audio file can begin playing. In some embodiments, the audio start and video start can correspond with the same time (e.g., 0:00 of the video preview). In some embodiments, the audio end and video end can correspond with the same time (e.g., 2:00 of a 2-minute video preview).

In an embodiment, the composite audio file is looped to play continuously while the first video preview and the second video are played (e.g., because the duration of the composite audio file is shorter than the duration of the first video preview). For example, the audio file can be 60 seconds long and the video can be 10 seconds long. When looped, the same 10 second portion of video plays and repeats for a viewer six times, while a single 60 second clip of audio plays once.

In an embodiment, the composite audio file is looped using other methods. For example, the composite audio file can be looped to play continuously according to a composite audio rule or looped to play continuously while the composite audio-video object is active. For example, while the composite of video previews is located at a particular location on a screen of a computing device, the video preview(s) and audio file(s) can play. Other objects may not play (e.g., sound or video).

In an embodiment, the composite audio file is not played for at least a portion of the time that the first video preview is playing. For example, the composite audio rule can identify an audio start as 0:10 of the one-minute video preview, so that the corresponding audio is not played for the first ten seconds.

B. Browsing Video Previews that Use Non-Consecutive Frames

FIG. 7 shows a flowchart illustrating a method of browsing video previews with audio according to an embodiment of the present invention.

At block 710, an audio-video object can be received. The audio-video object can include a video preview corresponding to non-consecutive frames of a full video and an audio file. The audio file may be a full audio file from a full video.

In some examples, the audio-video object can be received from a computing device (e.g., a provider server 220). The computing device may also create the audio-video object and provide the object to another computing device (e.g., a user device 230).

The video preview can correspond to non-consecutive frames of a full video. For example, the full video can include ten frames total (e.g., at one frame per second, the full video would be ten seconds long). Consecutive frames can include frames 1-4 and non-consecutive frames can include frames 1, 2, 5, 6, and 10. The non-consecutive frames can be used to create a video preview. The video preview can contain the same bit rate or a faster bit rate to create a video preview that is a shorter duration than the full video. More or fewer frames can be used without diverting from the essence of the invention.

In some embodiments, a video preview can be non-consecutive frames and the audio for the non-consecutive frames can correspond with other parts of the full video (e.g., not corresponding to the selected frames or images). For example, the video preview can correspond with a building crashing to the ground and the audio can include someone explaining what the building will look like when it crumbles. In another example, the audio may include an unrelated audio file from another full video or audio file. In yet another example, audio can be for frames 1-100, and only frames 80-100 are used in the video preview.

At block 720, an activation of the audio-video object can be received. For example, the audio-video object can be activated based on the object moving to a particular location in the screen of the computing device (e.g., user device 230). In another example, the audio-video object may be activated when a GUI is initially provided at the computing device.

At block 730, the video preview and audio file can be played. In some embodiments, the audio file does not correspond with the audio of the non-consecutive frames. For example, the audio file is from the full audio file and does not correspond to the audio of the non-consecutive frames of the video preview.

C. GUI for Displaying and Browsing Video Previews

Figure 8:
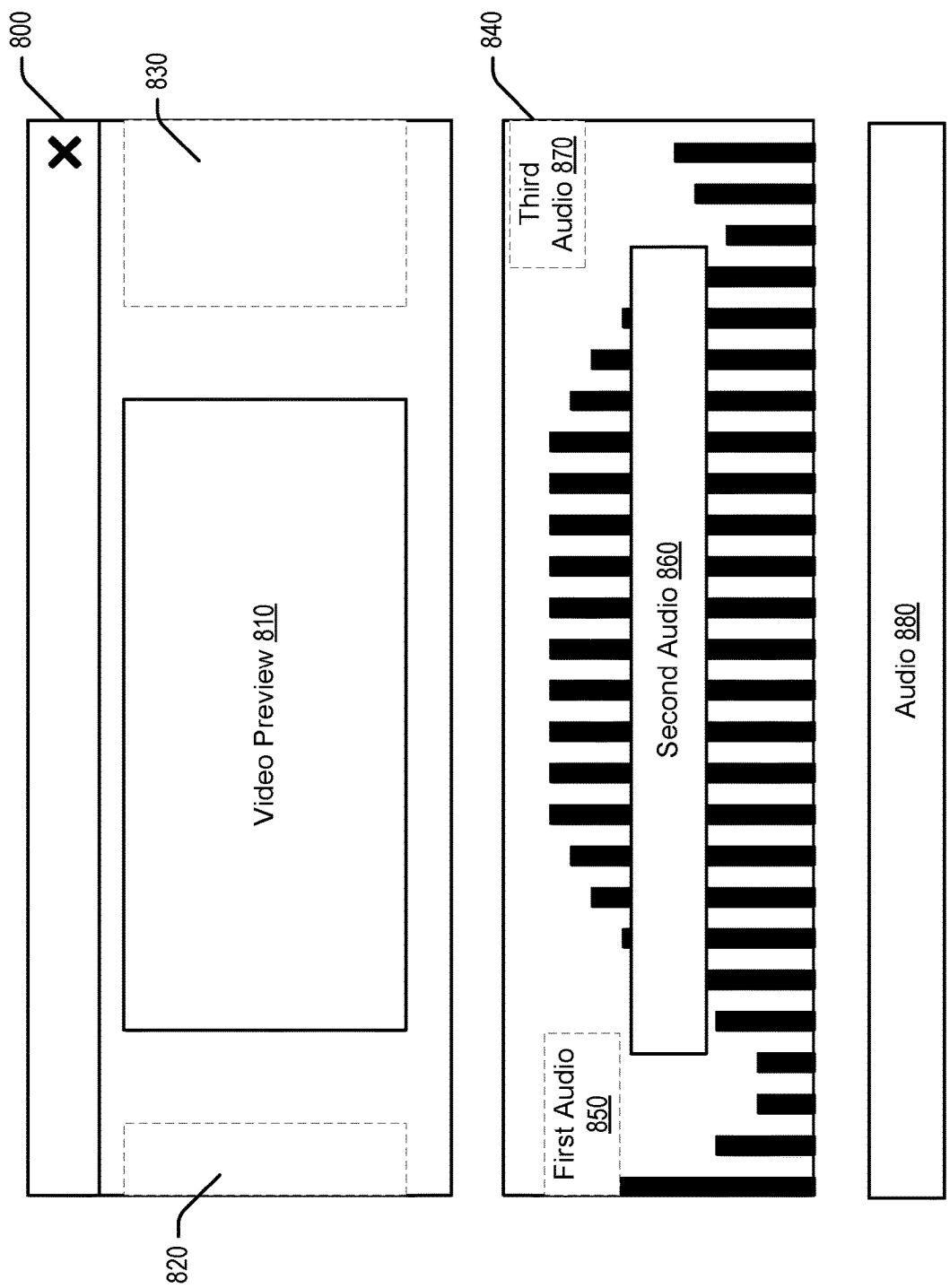
FIG. 8 shows a graphical user interface illustrating an application that displays video previews with audio according to an embodiment of the present invention.

FIG. 8 shows a graphical user interface illustrating an application that displays video previews with audio according to an embodiment of the present invention. The GUI 800 can include one or more video previews 810, 820, 830 and corresponding audio.

The audio may correlate with the video preview, such that video preview 810 corresponds with a first audio 850, video preview 820 corresponds with a second audio 860, and video preview 830 corresponds with a third audio 870. Alternatively, a general audio file 880 can correspond with the plurality of video previews. In some embodiments, GUI 840 may be displayed when the audio-video object is created but not when the user browses the video previews with audio.

When audio corresponds with a particular video preview, the location of the video preview may affect the audio (e.g., pitch, volume, fading, Doppler shift). For example, the audio may play while these previews are selected and/or activated and the video associated with these groups of video previews are playing. The audio associated with other composites may be silent. When a user swipes or changes the focus (e.g., clicks on an object displayed by the GUI 800 other than the video preview) so that other video previews and/or frame objects become activated, the system can gauge, in a Doppler Shift-like audio effect, how the audio would change if an object was moving farther away from the user.

In another example, the pitch may change to seem like one video preview is physically moving farther away from the user. For example, when first audio 850 corresponding with video preview 820 is moved from one location to another location (e.g., from the center location to the far left location, partially off the screen), the pitch for first audio 850 may be adjusted to simulate that the source of the audio is moving farther from the user. In another example, when second audio 860 corresponding to video preview 810 is moved from one location to another location (e.g., from far left location to the center location), the pitch for second audio 860 may be adjusted to simulate that the source of the audio is moving closer to the user. The pitch may also change for the audio associated with other composites to simulate the videos physically moving closer to the user.

In some embodiments, the audio may fade in or out. For example, there may be one video preview associated with one audio on a GUI. When the video preview appears on the screen (e.g., moving from right to left, video preview 810), the audio can fade in as the video preview moves closer to the center of the screen. The audio may also fade out the farther the video preview moves to the center of the screen (e.g., near the location of video preview 830). In another example, in response to identifying that the frame object is located at the particular location on the display in the GUI of the computing device, the audio can be faded in or out, irrespective of the location of the video preview to the center of the screen (e.g., top of the screen to bottom of the screen, closer or farther from the corner of the screen).

When more than one video preview is identified on a GUI, the locations of both video previews can affect the audio. For example, in response to identifying that the first frame object is located at the particular location on the display in the GUI. A first audio file (that corresponds with the first video preview) can fade out and a second audio file (that corresponds with the second video preview) can fade in.

VI. Example Subsystems and Components

Figure 9:
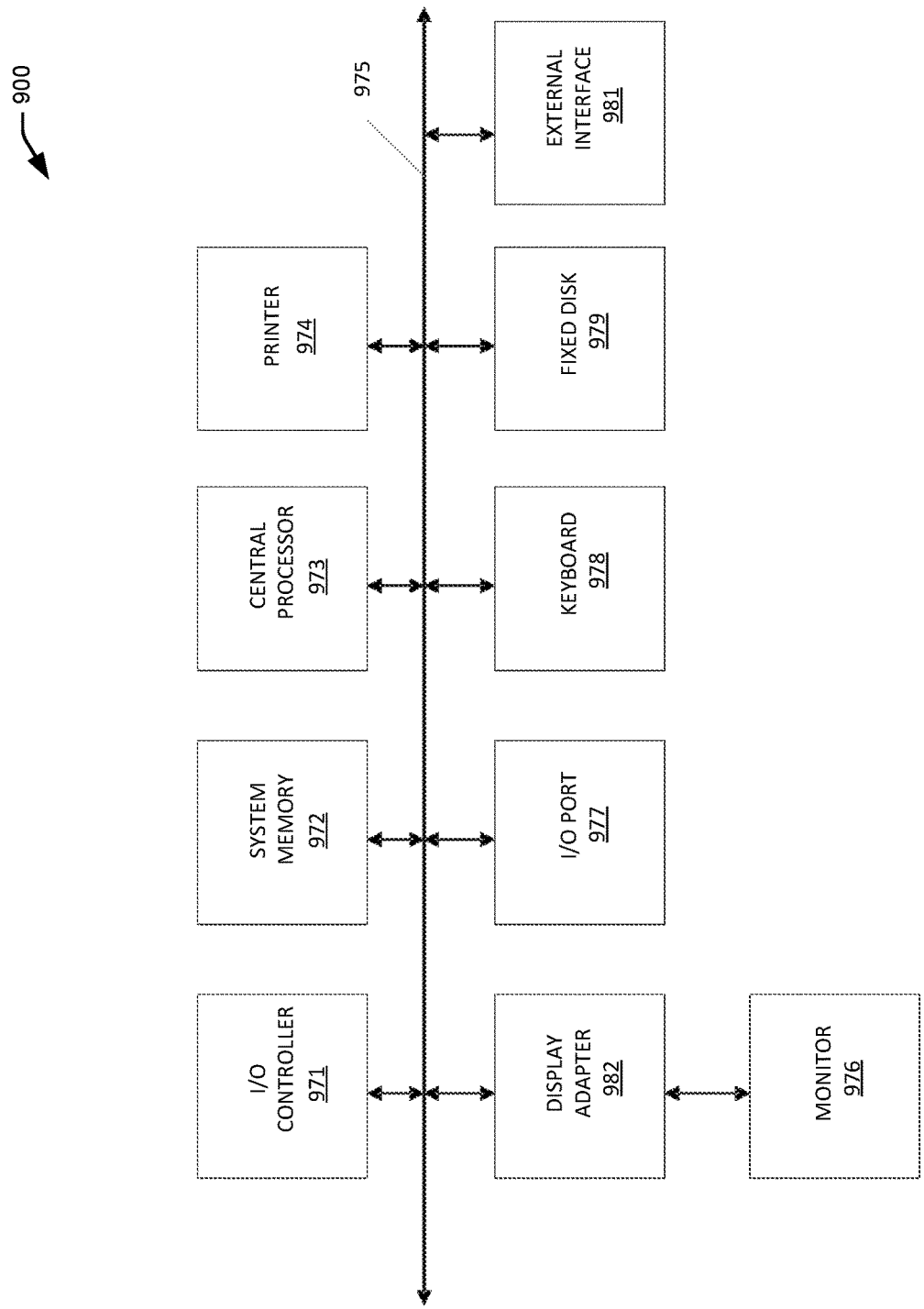
FIG. 9 shows a block diagram of a computer apparatus according to an embodiment of the present invention.

Any of the clients or servers may utilize any suitable number of subsystems. Examples of such subsystems or components are shown in FIG. 9. The subsystems shown in FIG. 9 are interconnected via a system bus 975. Additional subsystems such as a printer 974, keyboard 978, fixed disk 979, monitor 976, which is coupled to display adapter 982, and others are shown. Peripherals and input/output (I/O) devices, which couple to I/O controller 971, can be connected to the computer system by any number of means known in the art, such as input/output (I/O) port 977 (e.g., USB, FireWire®) For example, I/O port 977 or external interface 981 (e.g. Ethernet, Wi-Fi, etc.) can be used to connect the computer apparatus to a wide area network such as the Internet, a mouse input device, or a scanner. The interconnection via system bus allows the central processor 973, which may include one or more processors, to communicate with each subsystem and to control the execution of instructions from system memory 972 or the fixed disk 979 (such as a hard drive or optical disk), as well as the exchange of information between subsystems. The system memory 972 and/or the fixed disk 979 may embody a computer readable medium. Any of the data mentioned herein can be output from one component to another component and can be output to the user.

It should be understood that any of the embodiments of the present invention can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java®, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

What is claimed is:

1. A method comprising:
receiving an audio file by a computing device, wherein the audio file comprises an audio start and an audio stop;
receiving a video preview file by the computing device, wherein the video preview file comprises a video start and a video stop, wherein the video preview file is generated from a portion of a full video;
analyzing an audio rule, wherein the audio rule specifies one or more criteria for how the audio file is to be played when the video preview file is played in response to an audio-video object being activated; and
generating the audio-video object that combines the audio file and the video preview file, wherein the audio file and the video preview file are played according to the audio rule when the audio-video object is activated, and wherein when the audio-video object is activated, the audio file is played according to the audio rule such that the audio start is not synchronized with the video start for at least a portion of a duration of playing the audio-video object.

2. The method of claim 1, wherein the audio rule also specifies fading the audio file.

3. The method of claim 2, wherein the audio-video object is activated at a screen of a playback device, and wherein the audio rule fades audio of the audio file based on movement of the audio-video object on the screen of the playback device.

4. The method of claim 1, wherein the audio start and the video start are synchronized to play the audio file and the video preview file simultaneously when the audio-video object is activated.

5. The method of claim 1, wherein a first duration of the audio file is shorter than a second duration of the video preview file and greater than zero.

6. The method of claim 1, wherein the audio rule specifies looping audio of the audio file to correlate the audio stop with the video stop and looping the audio plays the audio file continuously while the video preview file is played.

7. The method of claim 1, wherein an updated audio rule specifies looping audio of the audio file to correlate the audio stop with the video stop.

8. The method of claim 1, wherein the video preview file plays continuously one or more times with the audio-video object.

9. The method of claim 1, wherein when the audio-video object is activated, the audio file is not played for at least the portion of the duration when the video preview file is played.

10. The method of claim 1, further comprising:
receiving an activation of the audio-video object; and
playing the audio-video object in response to receiving the activation.

11. A computer product comprising a non-transitory computer readable medium storing a plurality of instructions that when executed control a playback device to play a video preview file with audio, the instructions comprising:

receiving an audio file, wherein the audio file comprises an audio start and an audio stop;

receiving the video preview file, wherein the video preview file comprises a video start and a video stop, wherein the video preview file is generated from a portion of a full video; and analyzing an audio rule, wherein the audio rule specifies one or more criteria for how the audio file is to be played when the video preview file is played in response to an audio-video object being activated;

generating the audio-video object that combines the audio file and the video preview file, wherein the audio file and the video preview file are played according to the audio rule when the audio-video object is activated; and wherein when the audio-video object is activated, the audio file is played according to the audio rule such that the audio start is not synchronized with the video start for at least a portion of a duration of playing the audio-video object.

12. The computer product of claim 11, wherein the audio rule also specifies fading the audio file.

13. The computer product of claim 12, wherein the audio-video object is activated at a screen of the playback device, and wherein the audio rule fades audio of the audio file based on movement of the audio-video object on the screen of the playback device.

14. The computer product of claim 11, wherein the audio start and the video start are synchronized to play the audio file and the video preview file simultaneously when the audio-video object is activated.

15. The computer product of claim 11, wherein a first duration of the audio file is shorter than a second duration of the video preview file and greater than zero.

16. The computer product of claim 11, wherein the audio rule specifies looping audio of the audio file to correlate the audio stop with the video stop and looping the audio plays the audio file continuously while the video preview file is played.

17. A system comprising:
one or more processors configured to:
receive an audio file, wherein the audio file comprises an audio start and an audio stop;

receive a video preview file, wherein the video preview file comprises a video start and a video stop, wherein the video preview file is generated from a portion of a full video;

analyze an audio rule, wherein the audio rule specifies one or more criteria for how the audio file is to be played when the video preview file is played in response to an audio-video object being activated; and generate the audio-video object that combines the audio file and the video preview file, wherein the audio file and the video preview file are played according to the audio rule when the audio-video object is activated, and wherein when the audio-video object is activated, the audio file is played according to the audio rule such that the audio start is not synchronized with the video start for at least a portion of a duration of playing the audio-video object.

18. The system of claim 17, wherein the audio rule also specifies fading the audio file.

19. The system of claim 18, wherein the audio-video object is activated at a screen of a playback device, and wherein the audio rule fades audio of the audio file based on movement of the audio-video object on the screen of the playback device.

20. The system of claim 17, wherein the audio start and the video start are synchronized to play the audio file and the video preview file simultaneously when the audio-video object is activated.

21. The system of claim 17, wherein a first duration of the audio file is shorter than a second duration of the video preview file and greater than zero.

22. The system of claim 17, wherein the audio rule specifies looping audio of the audio file to correlate the audio stop with the video stop and looping the audio plays the audio file continuously while the video preview file is played.

* * * * *